United States Patent
Kim

(10) Patent No.: US 11,794,804 B2
(45) Date of Patent: Oct. 24, 2023

(54) APPARATUS AND METHOD FOR CONTROLLING MOTOR DRIVEN POWER STEERING SYSTEM

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 147 days.

(21) Appl. No.: 17/492,239

(22) Filed: Oct. 1, 2021

(65) Prior Publication Data

US 2022/0144336 A1     May 12, 2022

(30) Foreign Application Priority Data

Nov. 11, 2020 (KR) .......................... 10-2020-0150045

(51) Int. Cl.
    *B62D 5/04*     (2006.01)
    *B62D 15/02*     (2006.01)
    *G05B 13/02*     (2006.01)

(52) U.S. Cl.
    CPC .......... *B62D 5/0481* (2013.01); *B62D 15/025* (2013.01); *G05B 13/024* (2013.01)

(58) Field of Classification Search
    CPC .. B62D 5/0481; B62D 15/025; B62D 5/0463; B62D 6/00; G05B 13/024; B60W 10/20;
(Continued)

(56) References Cited

U.S. PATENT DOCUMENTS 4,716,981 A * 1/1988 Murao ............... B62D 7/148
    180/412
4,836,319 A * 6/1989 Haseda .............. B62D 7/159
    701/42

(Continued)

FOREIGN PATENT DOCUMENTS

CN     104137409 A   * 11/2014  ........ H02M 1/0025
CN     109204298          1/2019
(Continued)

OTHER PUBLICATIONS

"Modification of vehicle handling characteristics via steer-by-wire;" Yih et., IEEE Transactions on Control Systems Technology (vol. 13, Issue: 6, pp. 965-976); Nov. 1, 2005. (Year: 2005).*

(Continued)

*Primary Examiner* — Khoi H Tran
*Assistant Examiner* — Jorge O Peche
(74) *Attorney, Agent, or Firm* — DLA PIPER LLP (US)

(57) ABSTRACT

Disclosed are an apparatus and a method for controlling a motor driven power steering system. The apparatus for controlling a motor driven power steering system includes a steering angle position controller configured to control a steering angle by adjusting a gain value based on a steering angle error between a command steering angle inputted by an autonomous driving system and a current steering angle; a current controller configured to compensate for a current error between a second command current outputted from the steering angle position controller and a sensor current; and a disturbance estimator configured to estimate noise due to an external factor, to remove the estimated noise in advance from a third command current outputted from the current controller, and to apply the third command current with no noise to an MDPS.

16 Claims, 4 Drawing Sheets

(58) Field of Classification Search
CPC ....... B60W 40/105; B60W 2050/0022; B60W 2050/0055; B60W 2050/0056; B60W 2520/10; B60W 2540/18; B60W 2710/207

See application file for complete search history.

(56) References Cited

U.S. PATENT DOCUMENTS

| | | | | |
|---|---|---|---|---|
| 4,910,799 | A * | 3/1990 | Takayama | H04B 1/1081 455/306 |
| 5,238,079 | A * | 8/1993 | Gorim | B62D 5/0415 180/446 |
| 5,349,386 | A * | 9/1994 | Borchardt | H04R 5/033 348/E5.093 |
| 5,471,534 | A * | 11/1995 | Utter | H04B 1/1646 381/5 |
| 5,554,969 | A * | 9/1996 | Eguchi | B62D 15/0225 180/404 |
| 5,765,116 | A * | 6/1998 | Wilson-Jones | G05D 1/0246 340/439 |
| 9,193,379 | B2 * | 11/2015 | Jang | B62D 5/0472 |
| 10,562,566 | B2 * | 2/2020 | Kim | B62D 6/008 |
| 11,285,973 | B2 * | 3/2022 | Kim | B60W 60/0053 |
| 11,358,628 | B2 * | 6/2022 | Kim | B62D 15/025 |
| 11,358,630 | B2 * | 6/2022 | Kim | B62D 1/16 |
| 11,669,094 | B2 * | 6/2023 | Kim | B62D 15/0265 701/23 |
| 2004/0040778 | A1 * | 3/2004 | Katou | B62D 5/003 180/402 |
| 2007/0021875 | A1 * | 1/2007 | Naik | B60W 30/045 701/72 |
| 2009/0048736 | A1 * | 2/2009 | Kristensen | B63H 25/02 701/42 |
| 2009/0088917 | A1 * | 4/2009 | Ross-Martin | B62D 9/002 701/23 |
| 2009/0125186 | A1 * | 5/2009 | Recker | B62D 5/0472 701/41 |
| 2009/0192679 | A1 * | 7/2009 | Kobayashi | B62D 5/0472 701/42 |
| 2009/0254254 | A1 * | 10/2009 | Wang | B62D 6/002 701/43 |
| 2010/0280715 | A1 * | 11/2010 | Kobayashi | B62D 5/0472 701/41 |
| 2010/0286871 | A1 | 11/2010 | Kobayashi | |
| 2010/0324785 | A1 * | 12/2010 | Kurishige | B62D 5/046 701/42 |
| 2011/0153162 | A1 * | 6/2011 | Kezobo | B62D 5/0463 701/42 |
| 2011/0209939 | A1 * | 9/2011 | Ono | B62D 6/008 180/447 |
| 2011/0241579 | A1 * | 10/2011 | Kimpara | B62D 5/046 318/400.02 |
| 2014/0156134 | A1 * | 6/2014 | Cullinane | B60R 16/023 701/23 |
| 2014/0343697 | A1 * | 11/2014 | Kuipers | B60W 50/085 700/83 |
| 2015/0066299 | A1 * | 3/2015 | Jang | B62D 5/0466 701/41 |
| 2017/0166028 | A1 * | 6/2017 | Kubota | B60G 17/01908 |
| 2017/0203788 | A1 * | 7/2017 | Heo | B62D 1/286 |
| 2018/0015945 | A1 * | 1/2018 | Kim | B62D 6/002 |
| 2018/0154935 | A1 * | 6/2018 | Ohsugi | G01S 17/42 |
| 2018/0178834 | A1 * | 6/2018 | Moreillon | B62D 5/0463 |
| 2018/0186406 | A1 * | 7/2018 | Itou | B62D 5/0463 |
| 2019/0002019 | A1 * | 1/2019 | Tsubaki | B62D 5/0463 |
| 2019/0002022 | A1 * | 1/2019 | Kim | B62D 5/0466 |
| 2019/0009779 | A1 * | 1/2019 | Kim | B62D 6/10 |
| 2019/0009816 | A1 * | 1/2019 | Moreillon | B62D 6/08 |
| 2019/0023319 | A1 * | 1/2019 | Tyrrell | B62D 6/003 |
| 2019/0210638 | A1 * | 7/2019 | Ueno | B62D 6/00 |
| 2019/0300013 | A1 * | 10/2019 | Shiraishi | B60W 60/0053 |
| 2019/0300044 | A1 * | 10/2019 | Tsubaki | B62D 5/04 |
| 2019/0383707 | A1 * | 12/2019 | Yu | G01L 5/221 |
| 2020/0010111 | A1 * | 1/2020 | Tsubaki | B62D 5/0463 |
| 2020/0062293 | A1 * | 2/2020 | Yeom | B62D 5/006 |
| 2020/0070878 | A1 * | 3/2020 | Du | B62D 7/18 |
| 2020/0079422 | A1 * | 3/2020 | Wijffels | B62D 15/02 |
| 2020/0094870 | A1 * | 3/2020 | Shoji | B62D 5/0463 |
| 2020/0130727 | A1 * | 4/2020 | Kim | B62D 15/025 |
| 2020/0307642 | A1 * | 10/2020 | Tsuji | B60W 50/10 |
| 2021/0009194 | A1 * | 1/2021 | Kim | B62D 1/16 |
| 2021/0197890 | A1 * | 7/2021 | Kim | B62D 6/007 |
| 2021/0269030 | A1 * | 9/2021 | Uemura | B60W 10/04 |
| 2021/0323579 | A1 * | 10/2021 | Kim | G05D 1/0061 |
| 2021/0331734 | A1 * | 10/2021 | Kim | B62D 15/025 |
| 2021/0347406 | A1 * | 11/2021 | Kim | B62D 5/0463 |
| 2021/0382487 | A1 * | 12/2021 | Kim | G05D 1/0212 |
| 2022/0009549 | A1 * | 1/2022 | Kim | G01P 3/481 |
| 2022/0009550 | A1 * | 1/2022 | Kim | B62D 15/025 |
| 2022/0144336 | A1 * | 5/2022 | Kim | G05B 13/024 |
| 2022/0283247 | A1 * | 9/2022 | Takenaka | G01R 15/202 |
| 2022/0363243 | A1 * | 11/2022 | Yang | B62D 15/021 |
| 2022/0379953 | A1 * | 12/2022 | Kim | B62D 5/0493 |
| 2023/0007915 | A1 * | 1/2023 | Kim | B62D 5/0481 |
| 2023/0010325 | A1 * | 1/2023 | Ishio | B62D 6/008 |
| 2023/0040500 | A1 * | 2/2023 | Kim | B62D 15/025 |
| 2023/0126269 | A1 * | 4/2023 | Kim | B62D 15/021 701/23 |

FOREIGN PATENT DOCUMENTS

| | | | | |
|---|---|---|---|---|
| EP | 1 837 266 | | 9/2007 | |
| EP | 1837266 | A1 * | 9/2007 | .......... B62D 5/0463 |
| EP | 3939862 | A1 * | 1/2022 | |
| EP | 4024055 | A1 * | 7/2022 | .......... G01R 15/202 |
| GB | 2186244 | A * | 8/1987 | .......... B62D 7/148 |
| JP | 2006193080 | A * | 7/2006 | .......... B62D 5/0463 |
| JP | 2008248915 | A * | 10/2008 | |
| KR | 20170070901 | A * | 6/2017 | |
| KR | 10-2019-0098783 | | 8/2019 | |
| KR | 102317921 | B1 * | 10/2021 | |
| KR | 20210157506 | A * | 12/2021 | |
| KR | 20220059666 | A * | 5/2022 | |
| KR | 20220064445 | A * | 5/2022 | |
| KR | 20220144460 | A * | 10/2022 | |
| KR | 20220167073 | A * | 12/2022 | |
| KR | 20230023081 | A * | 2/2023 | |
| WO | WO-0038969 | A1 * | 7/2000 | .......... B62D 5/046 |
| WO | WO-2009122606 | A1 * | 10/2009 | .......... B62D 5/046 |

OTHER PUBLICATIONS

"The development of vehicle stability control at Ford;" Tseng et al.; IEEE/ASME Transactions on Mechatronics (vol. 4, Issue: 3, pp. 223-234); Sep. 1, 1999. (Year: 1999).*

"A novel driver assist stability system for all-wheel-drive electric vehicles;" Tahami et al., IEEE Transactions on Vehicular Technology (vol. 52, Issue: 3, pp. 683-692); May 1, 2003. (Year: 2003).*

"A New Control Strategy of an Electric-Power-Assisted Steering System;" Marouf et al., IEEE Transactions on Vehicular Technology (vol. 61, Issue: 8, pp. 3574-3589); Dec. 14, 2012. (Year: 2012).*

English Language Abstract of KR 10-2019-0098783 dated Aug. 23, 2019.

Extended European Search Report dated Mar. 16, 2022 issued in EP 21199045.2.

Chinese Office Action dated May 25, 2023 issued in CN 202111197733.

English Language Abstract of CN 109204298 published Jan. 15, 2019.

* cited by examiner

APPARATUS AND METHOD FOR CONTROLLING MOTOR DRIVEN POWER STEERING SYSTEM

CROSS-REFERENCE TO RELATED APPLICATION

This application claims priority from and the benefit of Korean Patent Application No. 10-2020-0150045, filed on Nov. 11, 2020, which is hereby incorporated by reference for all purposes as if set forth herein.

BACKGROUND

Field

Exemplary embodiments of the present disclosure relate to an apparatus and a method for controlling a motor driven power steering system, and more particularly, to an apparatus and a method for controlling a motor driven power steering system, which can enhance instantaneous responsiveness when sudden steering is required during autonomous driving and stably maximize performance against noise due to external factors.

Discussion of the Background

In general, a hydraulic power steering apparatus using the hydraulic pressure of a hydraulic pump is used as a power-assisted steering apparatus for a vehicle, but a motor driven power steering (MDPS) system using an electric motor has been extensively used since the 1990s.

The existing hydraulic power steering apparatus always consumes power regardless of whether a steering wheel is turned because a hydraulic pump, which is a power source for assisting power, is driven by an engine. However, in the MDPS system, when the steering wheel is turned and a torque is generated, a motor driven by electric energy provides steering assistance power.

Accordingly, when the MDPS system (or motor driven power steering) is used, it is advantageous in that vehicle energy efficiency can be improved compared to the hydraulic power steering apparatus.

Meanwhile, when a risk of a collision or another accident suddenly occurs during autonomous driving, a vehicle adopting an autonomous driving mode needs to reduce a vehicle speed or avoid obstacles and the like through steering control. However, a vehicle adopting the existing autonomous driving mode is only designed to cope with a typical situation where an obstacle is detected in advance ahead of a designated distance, and is not designed to cope with an emergency situation (for example, a situation where a pedestrian or another vehicle suddenly cuts in front of the vehicle).

Accordingly, it is typically effective to reduce a vehicle speed in advance in a non-emergency situation, but sudden steering may be more effective in avoiding an accident in an emergency situation (for example, a situation where a pedestrian or another vehicle suddenly cuts in front of the vehicle). However, if an autonomous driving mode is canceled or is not normally performed in such an emergency situation, as in a vehicle adopting the existing autonomous driving mode, a driver (or a user) may be more at risk. Thus, a technology of maximizing responsiveness is required so that quick steering can be instantaneously achieved in response to an emergency situation while the autonomous driving mode is being continuously maintained. At this time, the motor of the MDPS can be controlled, but a steering wheel connected to a column may be shaken. When the responsiveness is unintentionally enhanced too much, control stability is reduced, which may reduce the responsiveness of a controller due to disturbance caused by external factors, frictional force of a mechanism, sensor noise, and the like, or cause unintentional vibration.

In this regard, it is required to develop a technology capable of enhancing instantaneous responsiveness when sudden steering is required during autonomous driving and stably maximizing performance against noise due to external factors.

The background art of the present disclosure is disclosed in Korean Patent Application Laid-Open No. 10-2019-0098783 (published on Aug. 23, 2019 and entitled "Apparatus for Controlling Handle of Vehicles").

SUMMARY

The present disclosure has been made to solve the above problems, and an object according to one aspect of the present disclosure is to provide an apparatus and a method for controlling a motor driven power steering system, which can enhance instantaneous responsiveness when sudden steering is required during autonomous driving of a vehicle and stably maximize performance against noise due to external factors.

An apparatus for controlling a motor driven power steering system in accordance with one aspect of the present disclosure may include: a steering angle position controller configured to control a steering angle by adjusting a gain value based on a steering angle error between a command steering angle inputted by an autonomous driving system and a current steering angle; a current controller configured to compensate for a current error between a second command current outputted from the steering angle position controller and a sensor current; and a disturbance estimator configured to estimate noise due to an external factor, to remove the estimated noise in advance from a third command current outputted from the current controller, and to apply the third command current with no noise to an MDPS.

In the present disclosure, the steering angle position controller may include: a steering angle control unit configured to output a command speed by compensating for the steering angle error that is a difference between the command steering angle and the current steering angle, and to output a first command current by compensating for a speed error that is a difference between the command speed and a current steering angular velocity; a variable high-pass filter configured to high-frequency filter the steering angle error by adjusting a cut-off frequency; a gain adjustment section configured to adjust a gain of the variable high-pass filter by using at least one of a vehicle speed and the current steering angular velocity; and an adjustment section configured to output a second command current by arithmetically processing the first command current outputted from the steering angle control unit and a required current outputted from the gain adjustment section.

In the present disclosure, the variable high-pass filter may adjust the cut-off frequency by adjusting a differential time of a transfer function.

In the present disclosure, the gain adjustment section may adjust the gain by multiplying a load curve gain based on the vehicle speed, the current steering angular velocity, and a preset ratio.

In the present disclosure, the steering angle control unit may include: a position controller configured to compensate for the steering angle error; and a speed controller configured to compensate for the speed error between a command speed outputted from the position controller and the current steering angular velocity.

In the present disclosure, the apparatus may further include a vibration sensing section configured to detect vibration on the basis of the number of changes in a sign of the steering angular velocity, and to return the cut-off frequency or the gain to an initial value according to the detected vibration.

In the present disclosure, the disturbance estimator may include: an inverse transfer function unit configured to calculate an inverse transfer function of the MDPS and to apply output of the MDPS to the inverse transfer function; a first variable Q-filter provided at a front terminal of the inverse transfer function unit and configured to convert the degrees of a numerator and a denominator of the inverse transfer function to be equal to each other; a second variable Q-filter provided in parallel to an input terminal of the MDPS; a noise estimation unit configured to calculate a noise estimate by subtracting output of the second variable Q-filter from a multiplication result of the inverse transfer function unit and the first variable Q-filter; and a noise removal unit configured to subtract the noise estimate from the third command current and apply a subtraction result to the MDPS.

In the present disclosure, the first variable Q-filter and the second variable Q-filter may be low-pass filters.

In the present disclosure, the low-pass filter may adjust a cut-off frequency according to a current steering angular velocity.

A method for controlling a motor driven power steering system in accordance with another aspect of the present disclosure may include: a step in which a steering angle position controller controls a steering angle by adjusting a gain value based on a steering angle error between a command steering angle inputted by an autonomous driving system and a current steering angle; a step in which a current controller compensates for a current error between a second command current outputted from the steering angle position controller and a sensor current; and a step in which a disturbance estimator estimates noise due to an external factor, removes the estimated noise in advance from a third command current outputted from the current controller, and applies the third command current with no noise to an MDPS.

In the present disclosure, the step of controlling the steering angle may include: a step in which a steering angle control unit outputs a command speed by compensating for the steering angle error that is a difference between the command steering angle and the current steering angle, and outputs a first command current by compensating for a speed error that is a difference between the command speed and a current steering angular velocity; a step in which a variable high-pass filter high-frequency filters the steering angle error by adjusting a cut-off frequency; a step in which a gain adjustment section adjusts a gain of the variable high-pass filter by using at least one of a vehicle speed and the current steering angular velocity; and a step in which an adjustment section outputs a second command current by arithmetically processing the first command current outputted from the steering angle control unit and a required current outputted from the gain adjustment section.

In the present disclosure, in the step of high-frequency filtering the steering angle error, the variable high-pass filter may adjust the cut-off frequency by adjusting a differential time of a transfer function.

In the present disclosure, in the step of adjusting the gain of the variable high-pass filter, the gain adjustment section may adjust the gain by multiplying a load curve gain based on the vehicle speed, the current steering angular velocity, and a preset ratio.

In the present disclosure, the step of outputting the first command current may include: a step in which a position controller compensates for the steering angle error; and a step in which a speed controller compensates for the speed error between a command speed outputted from the position controller and the current steering angular velocity.

In the present disclosure, the method may further include a step in which a vibration sensing section detects vibration on the basis of the number of changes in a sign of the steering angular velocity, and returns the cut-off frequency or the gain to an initial value according to the detected vibration.

In the present disclosure, the step of removing the estimated noise in advance from the third command current outputted from the current controller and applying the third command current with no noise to the MDPS may include: a step in which an inverse transfer function unit calculates an inverse transfer function of the MDPS and applies output of the MDPS to the inverse transfer function; a step in which a first variable Q-filter provided at a front terminal of the inverse transfer function unit converts the degrees of a numerator and a denominator of the inverse transfer function to be equal to each other; a step in which a noise estimation unit calculates a noise estimate by subtracting output of a second variable Q-filter provided in parallel to an input terminal of the MDPS from a multiplication result of the inverse transfer function unit and the first variable Q-filter; and a step in which a noise removal unit subtracts the noise estimate from the third command current and applies a subtraction result to the MDPS.

In the present disclosure, the first variable Q-filter and the second variable Q-filter may be low-pass filters.

In the present disclosure, the low-pass filter may adjust a cut-off frequency according to a current steering angular velocity.

An apparatus and a method for controlling a motor driven power steering system in accordance with one aspect of the present disclosure have the effect of avoiding an accident by enhancing instantaneous responsiveness when sudden steering is required during autonomous driving of a vehicle and stably maximizing performance against noise due to external factors.

DETAILED DESCRIPTION OF THE ILLUSTRATED EMBODIMENTS

Figure 1:
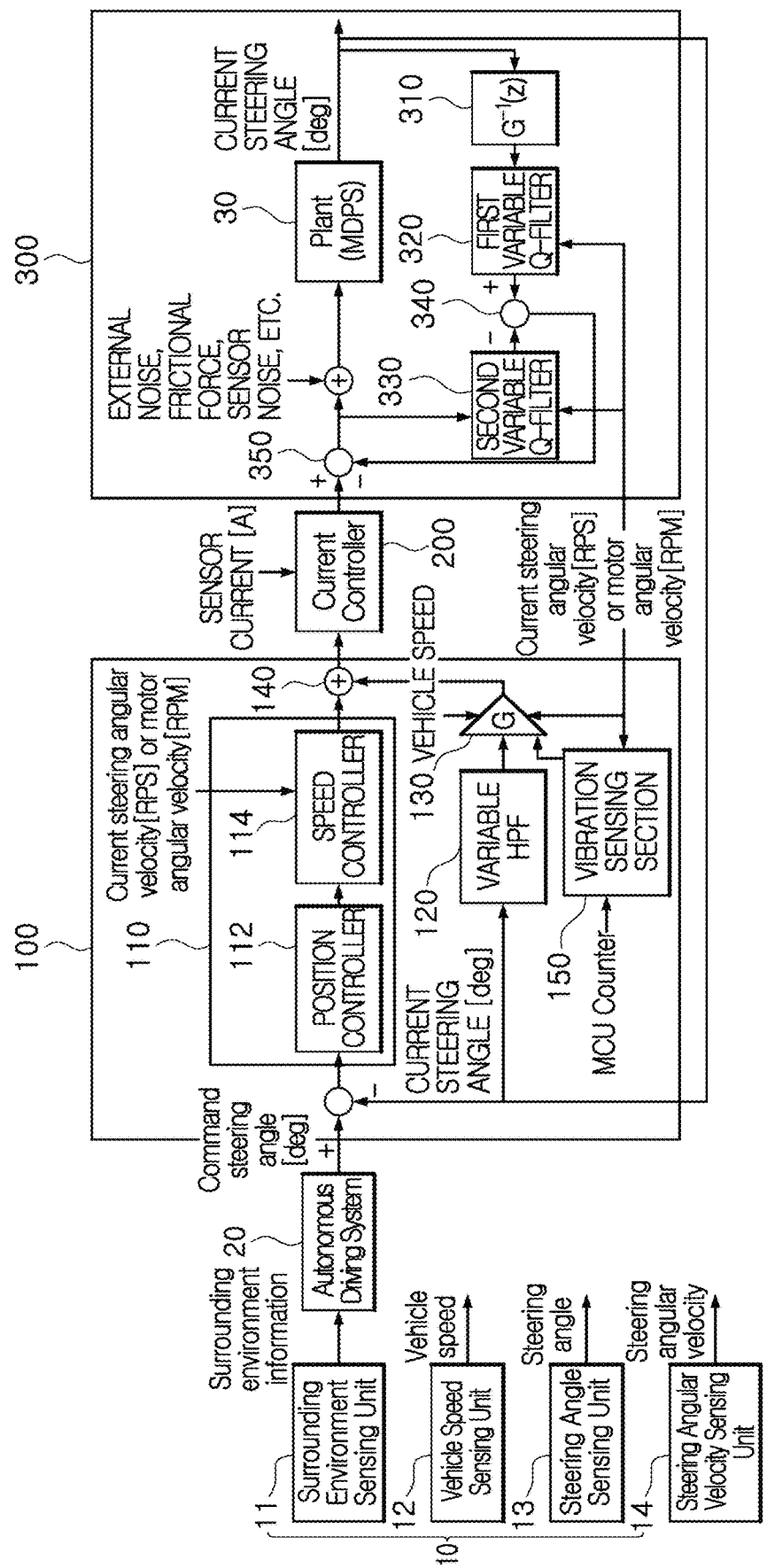
FIG. 1 is a block diagram illustrating a schematic configuration of an apparatus for controlling a motor driven power steering system in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and a method for controlling a motor driven power steering system in accordance with the present disclosure will be described in detail with reference to the accompanying drawings. In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined based on the disclosure over the present specification.

Furthermore, the implementations described in the present specification may be implemented as a method or process, an apparatus, a software program, a data stream or signal, for example. Although discussed only in the context of a single form of implementation (for example, discussed only as a method), the discussed features may also be implemented as other forms (for example, an apparatus or a program). The apparatus may be implemented as appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistant (PDA), and other devices that facilitate communication of information between end users.

Figure 2:
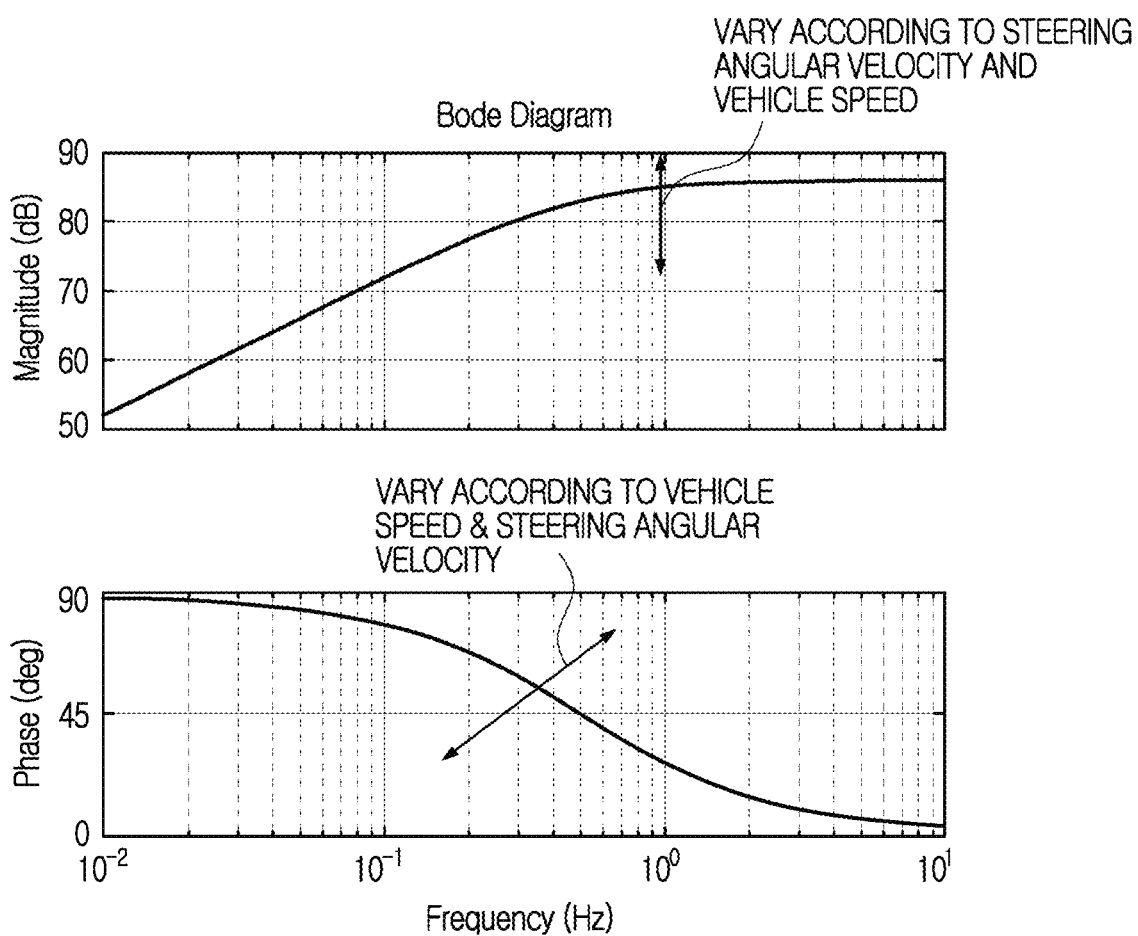
FIG. 2 is a diagram illustrating a change in the shape of a high-pass filter in accordance with an embodiment of the present disclosure.
Figure 3:
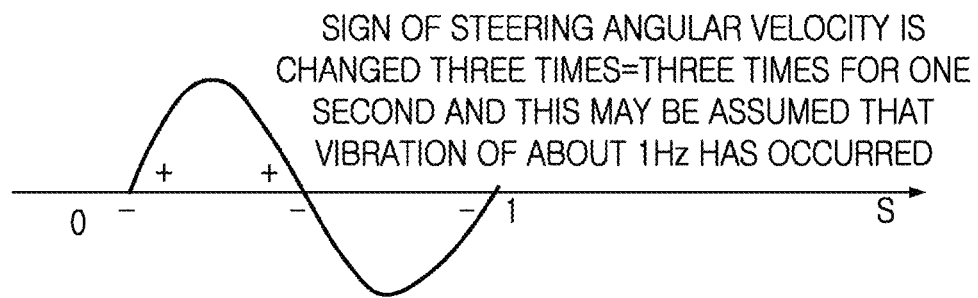
FIG. 3 is a diagram illustrating an example of changing a steering angular velocity sign in accordance with an embodiment of the present disclosure.

FIG. 1 is a block diagram illustrating a schematic configuration of an apparatus for controlling a motor driven power steering system in accordance with an embodiment of the present disclosure, FIG. 2 is a diagram illustrating a change in the shape of a high-pass filter in accordance with an embodiment of the present disclosure, and FIG. 3 is a diagram illustrating an example of changing a steering angular velocity sign in accordance with an embodiment of the present disclosure.

Referring to FIG. 1, the apparatus for controlling a motor driven power steering system in accordance with an embodiment of the present disclosure includes a sensing module 10, an autonomous driving system 20, a steering angle position controller 100, a current controller 200, and a disturbance estimator 300.

The sensing module 10 senses information necessary for autonomous driving and steering control. The sensing module 10 may include a surrounding environment sensing unit 11 that senses surrounding environment information necessary for an operation of the autonomous driving system 20, a vehicle speed sensing unit 12 that senses a vehicle speed of a vehicle, a steering angle sensing unit 13 that senses a steering angle of a steering wheel, and a steering angular velocity detection unit 14 that detects a steering angular velocity of the steering wheel.

The steering angular velocity detection unit 14 may directly detect the steering angular velocity from the steering wheel, but may also detect the steering angular velocity sensed by the steering angle sensing unit 13 by differentiating the steering angular velocity.

Examples of the surrounding environment sensing unit 11 may include a LIDAR, a radar, an ultrasonic sensor, an image sensor, and the like. Examples of the surrounding environment information may include road information, obstacle information, weather information, and the like. The surrounding environment information is not limited to the aforementioned examples.

The autonomous driving system 20 outputs a command steering angle for autonomous driving control of the vehicle on the basis of the surrounding environment information inputted by the surrounding environment sensing unit 11 in an autonomous driving mode.

Since those skilled in the art can easily embody that the autonomous driving system 20 performs the autonomous driving control on the basis of the surrounding environment information, detailed description thereof will be omitted.

The steering angle position controller 100 controls a steering angle by adjusting a gain according to a steering angle error (that is, position control error) that is a difference between the command steering angle and a current steering angle.

In general, the autonomous driving is performed through recent steering angle position control. That is, when the autonomous driving system 20 applies the command steering angle to an MDPS 30, the MDPS 30 performs position control according to the command steering angle. In general, the steering angle position controller 100 may include a steering angle control unit 110 including a position controller 112 and a speed controller 114.

The position controller 112 may compensate for the steering angle error that is a difference between the command steering angle and the current steering angle. The position controller 112 may be composed of a P controller.

The speed controller 114 may compensate for a speed error between a command speed outputted from the position controller 112 and the current steering angular velocity. The speed controller 114 may be composed of a PI controller.

However, the steering angle control unit 110 composed of the position controller 112 and the speed controller 114 has a limitation in enhancing responsiveness. Thus, the steering angle position controller 100 may further include a variable high-pass filter (HPF) 120, a gain adjustment section 130, and an adjustment section 140. The steering angle position controller 100 may high-frequency filter an error value that is a difference between the command steering angle and the current steering angle, and apply a value obtained by multiplying the filtered value by a gain to a front terminal of the current controller. This serves to add an additional required current to a command current, thereby enhancing the responsiveness of the steering angle position controller 100. Such a configuration is the same as a configuration in which a D controller is actually added, but for convenience, efficiency and the like of controller design, it is reconstructed with a combination of the variable HPF 120 and the gain adjustment section 130.

The variable HPF 120 removes a noise component by high-frequency filtering the steering angle error, which is a difference between the command steering angle and the current steering angle, by adjusting a cut-off frequency. In such a case, the variable HPF 120 may adjust the cut-off frequency by adjusting a differential time of a transfer function.

The gain adjustment section 130 adjusts a gain of the variable HPF 120 by using at least one of a vehicle speed and the current steering angular velocity. That is, the gain adjustment section 130 adjusts the gain by multiplying a load curve gain based on the vehicle speed, a command steering angular velocity, and a preset ratio.

The adjustment section 140 outputs a second command current by arithmetically processing a first command current outputted from the speed controller 114 and a required current outputted from the gain adjustment section 130. At this time, the adjustment section 140 may output the second command current by adding the first command current and the required current.

In a general autonomous driving mode, when steering angle control performance is too high, control stability may be reduced due to external noise, surrounding environments, and the like to cause vibration and the like, and the steering angle control performance may be reduced. Accordingly, it is very important to essentially maximize the steering angle control performance when necessary.

To this end, it is effective to use a PI-P controller or a PID-PI controller instead of a steering angle position controller 100 with a combination of P-PI controllers generally used. However, when a D controller is applied to the steering angle position controller 100, vibration may occur due to noise of the command steering angle, external environments, or noise. In general, the D controller is added to the steering angle position controller 100 to enhance responsiveness to a change in position, but this may cause vibration due to amplification caused by disturbance or noise introduced from the external environments, resulting in a reduction of the steering angle control performance.

In order to substantially prevent such a problem, a low-pass filter or a lag-compensator is usually applied to a front terminal of the D controller. However, in this case, the structure is complicated, and when a variation is required depending on steering situations, the number of parameters or factor values to be changed increases. That is, in general, the steering angle position controller 100 uses a PI-PI or PID-PI configuration in which a P controller terminal in a P-PI is designed with a PI or a PID. However, there is a need for a more efficient method capable of significantly improving responsiveness while being tolerant to noise or disturbance by maximizing the performance of the controller depending on steering situations.

Accordingly, when a low-pass filter (LPF) or a lag-compensator is typically applied to the D controller in the PID controller, an Equation G(s) may be expressed as $Kp(1+1/Ti \times s+Td \times s/(1+s \times Td))$. Here, G(s) may denote a transfer function, Kp may denote a proportional gain, Ti may denote an integration time, Td may denote a differential time, and s may denote a complex number. In the Equation above, when the PID control gain is separated (that is, Kp is separated according to the I or D controller), G(s) may be expressed as $Kp+Ki/Ti \times s+Kd \times s/(1+Td \times s)$. At this time, when the D control is rearranged, G(s) may be expressed as $(1/Td)/((1/Td+s)) \times Td \times Kd \times s$. Here, Ki may denote an integral gain and Kd may denote a differential gain.

Meanwhile, $(1/Td)/((1/Td+s))$ and s are similar to those of a first-order high-pass filter. By applying this, when the variable HPF 120 and the gain adjustment section 130 are applied instead of the D controller, it is possible to generate a structure that is robust to noise and can improve steering angle control performance. In such a case, the gain and the cut-off frequency of the variable HPF 120 are very important.

Typically, the cut-off frequency of a high-pass filter may be set by applying a motor control bandwidth of a motor driven power steering, for example, the MDPS 30. However, in order not to affect a torsion bar resonance point of the MDPS 30, it is important to set the cut-off frequency of the high-pass filter so as not to affect the resonance point by using, as cut-off points, about 12 Hz in the case of C-MDPS and about 9 Hz in the case of R-MDPS, respectively. For reference, the most significant factor in the stability of the MDPS 30 is a torsion bar. This is because the torsion bar has the lowest rigidity and is the point at which resonance is highly likely to occur.

In general, in the case of the differential time Td, the PID controller may define the control period and frequency of the D controller. In $(1/Td)/((1/Td)+s)) \times Td \times Kd \times s$ of the transfer function, $(1/Td)/((1/Td)+s))$ is the same as that of a high-pass filter and a desired frequency may be set through 1/Td. That is, the transfer function of a general high-pass filter may be expressed as $s/(s+w)$. Here, w may denote $2\pi f$ and f may denote a cut-off frequency. In the aforementioned transfer function, since 1/Td is directly w, the variable HPF 120 may adjust a cut-off frequency by varying the Td value in order to set a desired frequency.

The gain adjustment section 130 adjusts the gain by multiplying the load curve gain based on the vehicle speed, the command steering angular velocity, and the preset ratio.

The gain adjustment section 130 varies the differential gain Kd value in order to control the gain. As already defined, by increasing the Kd value in the transfer function as the steering angular velocity is high and decreasing the Kd value as the steering angular velocity is low, the gain response characteristics of the steering angle position controller 100 may be varied.

The important factors for determining the gain are the vehicle speed and the command steering angular velocity. In order to determine a load of the vehicle and a load applied to the MDPS 30, it is essential to consider the vehicle speed and the command steering angular velocity.

Accordingly, the gain adjustment section 130 finally adjusts the gain by multiplying the load curve gain value based on the vehicle speed, the steering angular velocity, and a ratio for substantially maintaining an appropriate parameter. The ratio may be variously set in consideration of various sudden steering environments in actual autonomous driving conditions. In consideration of the control stability of the MDPS 30, the load curve gain value based on the vehicle speed, the steering angular velocity, and the ratio are stored in a tuning map and operated. Since the gain increases only when the steering angular velocity is fast or the load based on the vehicle speed increases, the responsiveness is not increased in the case of low-speed steering, so that position control is smoothly performed without shaking of a steering wheel. In such a case, a fast steering response is not necessary, so smooth control performance may be prioritized. As a consequence, the shape of the variable HPF 120 may be changed as illustrated in FIG. 2. Referring to FIG. 2, the lower the vehicle speed, the lower the cut-off frequency of the variable HPF 120, so that the variable HPF 120 may respond to a wide bandwidth. The higher the vehicle speed, the higher the cut-off frequency of the variable HPF 120, so that the variable HPF 120 may respond to a narrow bandwidth.

However, when sudden steering is performed during autonomous driving, vibration and the like may occur due to factors such as external environments. In such a case, it is necessary to sense the vibration and the like in advance and to substantially prevent an excessive increase in the gain G or a change in the cut-off frequency of the variable HPF 120.

To this end, a vibration sensing section 150 monitors in realtime a change in the sign of the steering angular velocity for a specified period of time. For example, as illustrated in FIG. 3, when the sign of the steering angular velocity is changed a total of three times during the counting time for one second, it may be determined that noise of 1 Hz has been generated.

Typically, in the MDPS 30, since the torsion bar has the lowest rigidity, vibration is highly likely to occur at the resonant frequency of the torsion bar. This usually corresponds to 8 Hz to 12 Hz, and for example, when a sign change has occurred 17 times per second, it may be assumed that vibration of 8 Hz occurs, which may be considered as an excessive increase in the gain G or an excessive decrease in the cut-off frequency of the variable HPF 120. Accordingly, the vibration sensing section 150 detects vibration on the basis of the number of changes in the sign of the steering angular velocity, and returns the cut-off frequency or the gain to an initial value when the detected vibration is equal to or greater than set vibration. The initial value may be a gain G value or a cut-off frequency in a general autonomous driving mode.

Meanwhile, when the MDPS 30 performs position control in a normal situation during autonomous driving, the steering angle position controller 100 is designed and the PID gain is tuned in order to substantially prevent the resonance of the MDPS 30. However, when the performance of the steering angle position controller 100 is maximized for instantaneous obstacle avoidance, that is, when the gain G is instantaneously increased or the cut-off frequency of the variable HPF 120 is decreased to a region near 8 Hz to 12 Hz, a gain based on frequency characteristics increases. Thus, the stability of the steering angle position controller 100 is reduced, so that vibration may occur. This can be controlled by decreasing the gain G or returning the cut-off frequency of the variable HPF 120 to a level of a normal condition in which no vibration occurs when the vibration sensing section 150 detects a signal with the resonant frequency 8 Hz to 12 Hz of the torsion bar, which is not generally detected by the MDPS 30.

In other words, when the gain G of the steering angle position controller 100 is increased to enhance instantaneous responsiveness or the cut-off frequency is adjusted to increase the gain characteristics of a frequency requiring instantaneous steering (generally, in the case of the variable HPF 120, the lower the cut-off frequency, the higher the gain level based on the frequency of 8 Hz to 12 Hz), the safety margin of the steering angle position controller 100 is reduced. In this regard, in the present embodiment, the vibration sensing section 150 monitors the safety margin of the steering angle position controller 100, and returns the performance of the steering angle position controller 100 to the normal state again when it is determined that vibration occurs.

Through the above, autonomous driving cancellation is blocked in the case of sudden steering, and the performance of the steering angle position controller 100 is maximized through the variable HPF 120, which makes it possible to allow an autonomous driving vehicle to avoid obstacles in an emergency situation. In addition, the cut-off frequency of the variable HPF 120, which has been changed by the amount of a position control error, is returned again according to a general autonomous driving situation, and when vibration has occurred depending on the situation during sudden steering, a side effect due to emergency steering can also be substantially prevented by detecting the vibration and optimizing the variable HPF 120.

The current controller 200 compensates for a current error between a second command current outputted from the steering angle position controller 100 and a sensor current. In such a case, the current controller 200 may be a PI controller and the sensor current may be a current obtained by an MCU (not illustrated) that senses a motor.

When the second command current and the sensor current are received from the steering angle position controller 100 and the MCU, respectively, the current controller 200 may output a third command current by compensating for an error corresponding to a difference between the second command current and the sensor current.

Meanwhile, the performance of the control device may be reduced due to unexpected external factors such as external noise, frictional force, and sensor noise. In order to substantially prevent such a problem, it is necessary to observe the noise and remove the noise from the command current in advance. To this end, the present disclosure includes the disturbance estimator 300 that removes external noise due to external factors from the third command current outputted from the current controller 200.

The disturbance estimator 300 includes an inverse transfer function unit 310, a first variable Q-filter 320, a second variable Q-filter 330, a noise estimation unit 340, and a noise removal unit 350.

The inverse transfer function unit 310 calculates an inverse transfer function of the MDPS 30 and applies the output of the MDPS 30 to the inverse transfer function. When the output of the MDPS 30 is applied to the inverse transfer function, the inverse transfer function unit 310 may extract an input value of the MDPS 30, that is, a component in which the third command current and a noise component are added. By subtracting a current MDPS input value (that is, the third command current) from the extracted input value, only noise may be extracted. When this is applied to the actual output of the controller, input with no noise may be applied to the MDPS 30.

However, when the inverse transfer function of the MDPS 30 is calculated and applied, the degree of the numerator is larger than that of the denominator, which causes the instability of the MDPS 30 (system). For example, when it is assumed that there is a system called $s/(s^2+1)$, the inverse function thereof is $(s^2+1)/s$, which is generally defined in the form of an HPF or a filter in which an input signal diverges to infinity. Thus, it is not possible to design and apply the MDPS 30 (system) in such a way. In order to stabilize such system instability, a variable Q-filter may be applied. The variable Q-filter may be, for example, a low-pass filter. When a first-order low-pass filter $w/(s+w)$ is applied to the front terminal of the inverse transfer function unit 310, the degrees of the numerator and the denominator of the inverse transfer function of the MDPS 30 (system) are converted to be the same, so that the MDPS 30 (system) may be stabilized. By applying this in parallel to the input terminal of the MDPS 30 (system), the characteristics of the MDPS 30 (system) may not be actually affected. That is, the first variable Q-filter 320 may be applied to the front terminal of the inverse transfer function unit 310 and the second variable Q-filter 330 may be applied in parallel to the input terminal of the MDPS 30. At this time, it is important to set the cut-off frequency of the low-pass filter. The MDPS 30 (motor driven power steering) is a system to which a motor is applied, and as the motor actually rotates at a higher speed, actual control characteristics thereof are reduced due to the influence of a back electromotive force. That is, there occurs a phenomenon in which desired controller output is not outputted properly, and it is necessary to compensate for this phenomenon. This may be compensated for by the variable HPF 120 and the gain adjustment section 130 of the present disclosure, but in order to additionally improve such a point, the cut-off frequency of the low-pass filter needs to be shift forward. That is, it has the effect of increasing the bandwidth, so that responsiveness may be improved even at a high speed. However, when low-speed steering or smooth steering is required, responsiveness may be adjusted by lowering the cut-off frequency of the low-pass filter. With such a configuration, more precise control performance and optimized position control in various environments can be achieved.

The noise estimation unit 340 calculates a noise estimate by subtracting the output of the second variable Q-filter 330 from the multiplication result of the inverse transfer function unit 310 and the first variable Q-filter 320. For example, when the MDPS output is y, the inverse transfer function is $G^{-1}(z)$, the second variable Q-filter 330 is $Q(z)$, and a fourth command current is u, the noise estimation unit 340 may calculate a noise estimate $\hat{d}$ as expressed by Equation 1 below.

$$\hat{d}=Q(z)G^{-1}(z)y-Q(z)u \qquad \text{Equation 1}$$

The noise removal unit 350 subtracts the noise estimate from the third command current and applies the fourth command current to the MDPS 30. That is, when the noise estimate is subtracted from the third command current in advance, even though external noise is inputted before the command current is inputted to the MDPS 30, a desired command current may be inputted to the MDPS 30 because the noise estimate has been removed in advance. The desired command current may be a final command current to be inputted to the MDPS 30, that is, a command current in which the external noise is added to the fourth command current.

Hereinafter, a method for controlling a motor driven power steering system in accordance with an embodiment of the present disclosure will be described with reference to FIG. 4.

Figure 4:
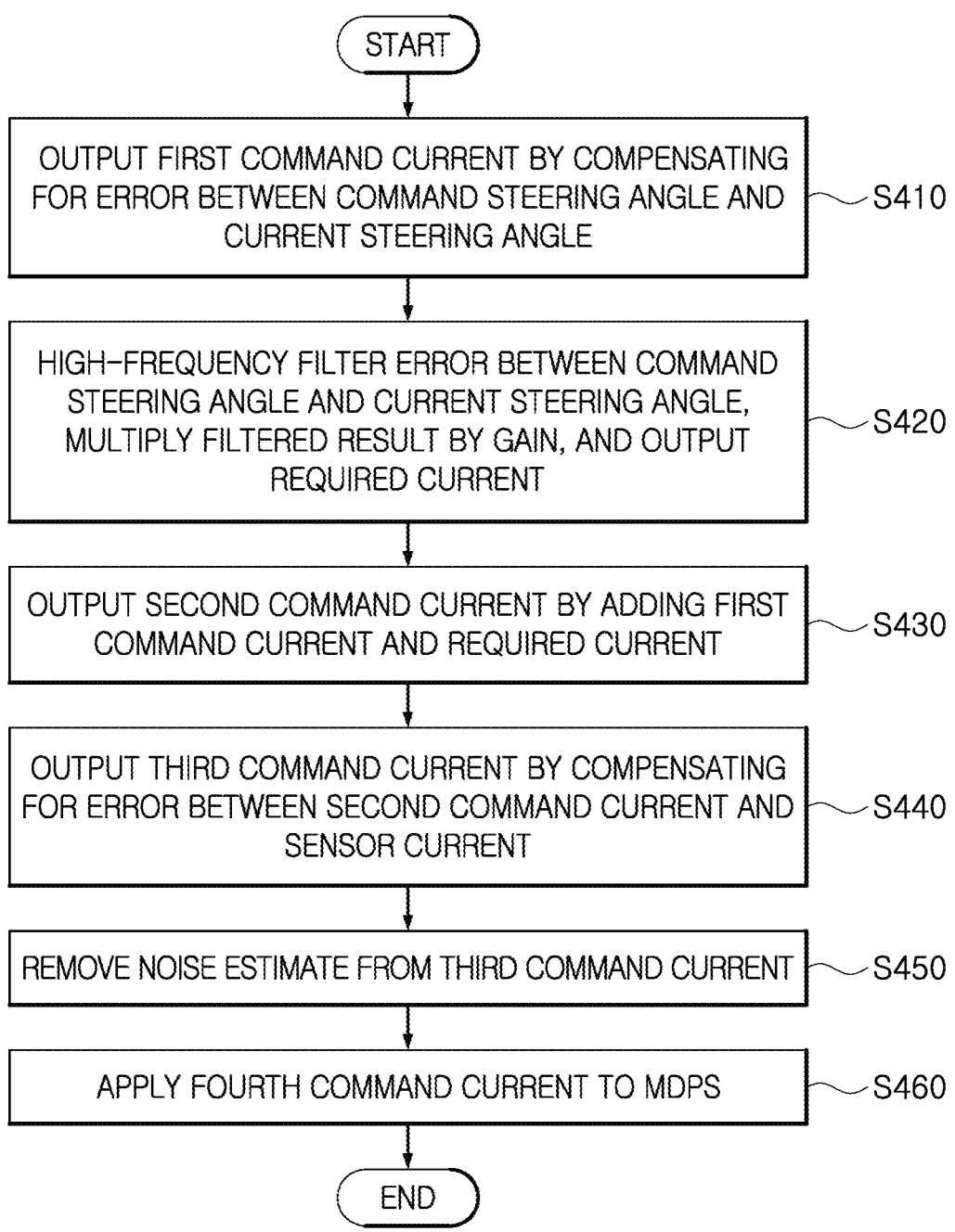
FIG. 4 is a flowchart for explaining a method for controlling a motor driven power steering system in accordance with an embodiment of the present disclosure.

FIG. 4 is a flowchart for explaining a method for controlling a motor driven power steering system in accordance with an embodiment of the present disclosure.

Referring to FIG. 4, the steering angle position controller 100 outputs the first command current by compensating for an error that is a difference between the command steering angle inputted by the autonomous driving system 20 and the current steering angle inputted by the steering angle sensing unit 13 (S410). At this time, the position controller 112 may compensate for a steering angle error that is a difference between the command steering angle and the current steering angle, and the speed controller 114 may compensate for a speed error that is a difference between the command speed outputted from the position controller 112 and the current steering angular velocity, so that the first command current may be outputted.

After step S410 is performed, the steering angle position controller 100 high-frequency filters the steering angle error that is a difference between the command steering angle and the current steering angle, multiplies the filtered result by a gain, and outputs a required current (S420). At this time, the variable HPF 120 may remove a noise component by high-frequency filtering the steering angle error that is a difference between the command steering angle and the current steering angle. Then, the gain adjustment section 130 may adjust the gain of the variable HPF 120 by multiplying a load curve gain based on a vehicle speed, a command steering angular velocity, and a preset ratio.

After step S420 is performed, the steering angle position controller 100 outputs the second command current by adding the first command current and the required current (S430). In this process, the vibration sensing section 150 monitors in realtime the number of changes in the sign of the steering angular velocity during a vibration setting time, detects vibration of the steering angle, and determines whether the detected vibration is equal to or greater than set vibration. As a result of the determination, when the vibration is equal to or greater than the set vibration, the vibration sensing section 150 may return the cut-off frequency or the gain to an initial value.

After step S430 is performed, the current controller 200 outputs the third command current by compensating for a current error between the second command current outputted from the steering angle position controller 100 and the sensor current (S440). At this time, when the second command current and the sensor current are received from the steering angle position controller 100 and the MCU, respectively, the current controller 200 may output the third command current by compensating for an error corresponding to a difference between the second command current and the sensor current.

After step S440 is performed, the disturbance estimator 300 subtracts the noise estimate from the third command current outputted from the current controller 200 (S450), and applies the fourth command current to the MDPS 30 (S460).

As described above, the apparatus and the method for controlling a motor driven power steering system in in accordance with one aspect of the present disclosure have the effect of avoiding an accident by enhancing instantaneous responsiveness when sudden steering is required during autonomous driving of a vehicle and stably maximizing performance against noise due to external factors.

Although the present disclosure has been described with reference to the embodiments illustrated in the drawings, the embodiments of the disclosure are for illustrative purposes only, and those skilled in the art will appreciate that various modifications and other equivalent embodiments are possible from the embodiments. Thus, the true technical scope of the present disclosure should be defined by the following claims.

What is claimed is:

1. An apparatus for controlling a motor driven power steering system, the apparatus comprising:
   a steering angle position controller configured to control a steering angle by adjusting a gain value based on a steering angle error between a command steering angle inputted by an autonomous driving system and a current steering angle, the steering angle position controller comprising:
   a steering angle control unit configured to output a command speed by compensating for the steering angle error that is a difference between the command steering angle and the current steering angle, and to output a first command current by compensating for a speed error that is a difference between the command speed and a current steering angular velocity;

a variable high-pass filter configured to high-frequency filter the steering angle error by adjusting a cut-off frequency;

a gain adjustment section configured to adjust a gain of the variable high-pass filter by using at least one of a vehicle speed and the current steering angular velocity; and an adjustment section configured to output a second command current by arithmetically processing the first command current outputted from the steering angle control unit and a required current outputted from the gain adjustment section;

a current controller configured to compensate for a current error between the second command current outputted from the steering angle position controller and a sensor current; and a disturbance estimator configured to estimate noise due to an external factor, to remove the estimated noise in advance from a third command current outputted from the current controller, and to apply the third command current with no noise to a motor driven power steering (MDPS).

2. The apparatus according to claim 1, wherein the variable high-pass filter is configured to adjust the cut-off frequency by adjusting a differential time of a transfer function.

3. The apparatus according to claim 1, wherein the gain adjustment section is configured to adjust the gain by multiplying a load curve gain based on the vehicle speed, the current steering angular velocity, and a preset ratio.

4. The apparatus according to claim 1, wherein the steering angle control unit comprises:
a position controller configured to compensate for the steering angle error; and
a speed controller configured to compensate for the speed error between a command speed outputted from the position controller and the current steering angular velocity.

5. The apparatus according to claim 1, further comprising:
a vibration sensing section configured to detect vibration on the basis of the number of changes in a sign of the steering angular velocity, and to return the cut-off frequency or the gain to an initial value according to the detected vibration.

6. An apparatus for controlling a motor driven power steering system, the apparatus comprising:
a steering angle position controller configured to control a steering angle by adjusting a gain value based on a steering angle error between a command steering angle inputted by an autonomous driving system and a current steering angle;
a current controller configured to compensate for a current error between a second command current outputted from the steering angle position controller and a sensor current; and
a disturbance estimator configured to estimate noise due to an external factor, to remove the estimated noise in advance from a third command current outputted from the current controller, and to apply the third command current with no noise to a motor driven power steering (MDPS), the disturbance estimator comprising:

an inverse transfer function unit configured to calculate an inverse transfer function of the MDPS and to apply output of the MDPS to the inverse transfer function;
a first variable Q-filter provided at a front terminal of the inverse transfer function unit and configured to convert degrees of a numerator and a denominator of the inverse transfer function to be equal to each other;
a second variable Q-filter provided in parallel to an input terminal of the MDPS;
a noise estimation unit configured to calculate a noise estimate by subtracting output of the second variable Q-filter from a multiplication result of the inverse transfer function unit and the first variable Q-filter; and
a noise removal unit configured to subtract the noise estimate from the third command current and apply a subtraction result to the MDPS.

7. The apparatus according to claim 6, wherein the first variable Q-filter and the second variable Q-filter are low-pass filters.

8. The apparatus according to claim 7, wherein at least one of the low-pass filters is configured to adjust a cut-off frequency according to a current steering angular velocity.

9. A method for controlling a motor driven power steering system, the method comprising:
controlling, by a steering angle position controller, a steering angle by adjusting a gain value based on a steering angle error between a command steering angle inputted by an autonomous driving system and a current steering angle;
outputting, by a steering angle control unit of the steering angle position controller, a command speed by compensating for the steering angle error that is a difference between the command steering angle and the current steering angle;
outputting, by the steering angle control unit, a first command current by compensating for a speed error that is a difference between the command speed and a current steering angular velocity;
high-frequency filtering, by a variable high-pass filter of the steering angle position controller, the steering angle error by adjusting a cut-off frequency;
adjusting, by a gain adjustment section of the steering angle position controller, a gain of the variable high-pass filter by using at least one of a vehicle speed and the current steering angular velocity;
outputting, by an adjustment section of the steering angle position controller, a second command current by arithmetically processing the first command current outputted from the steering angle control unit and a required current outputted from the gain adjustment section;
compensating, by a current controller, for a current error between the second command current outputted from the steering angle position controller and a sensor current;
estimating, by a disturbance estimator, noise due to an external factor;
removing, by the disturbance estimator, the estimated noise in advance from a third command current outputted from the current controller; and
applying, by the disturbance estimator, the third command current with no noise to an MDPS.

10. The method according to claim 9, wherein, in the high-frequency filtering of the steering angle error, the variable high-pass filter adjusts the cut-off frequency by adjusting a differential time of a transfer function.

11. The method according to claim 9, wherein, in the adjusting of the gain of the variable high-pass filter, the gain adjustment section adjusts the gain by multiplying a load curve gain based on the vehicle speed, the current steering angular velocity, and a preset ratio.

12. The method according to claim 9, wherein outputting the first command current comprises:
- compensating, by a position controller, for the steering angle error; and
- compensating, by a speed controller, for the speed error between a command speed outputted from the position controller and the current steering angular velocity.

13. The method according to claim 9, further comprising:
- detecting, by a vibration sensing section, vibration on the basis of the number of changes in a sign of the steering angular velocity; and
- returning, by the vibration sensing section, the cut-off frequency or the gain to an initial value according to the detected vibration.

14. The method according to claim 9, wherein removing the estimated noise in advance from the third command current outputted from the current controller and applying the third command current with no noise to the MDPS comprises:
- calculating, by an inverse transfer function unit, an inverse transfer function of the MDPS;
- applying, by the inverse transfer function unit, output of the MDPS to the inverse transfer function;
- converting, by a first variable Q-filter provided at a front terminal of the inverse transfer function unit, degrees of a numerator and a denominator of the inverse transfer function to be equal to each other;
- calculating, by a noise estimation unit, a noise estimate by subtracting output of a second variable Q-filter provided in parallel to an input terminal of the MDPS from a multiplication result of the inverse transfer function unit and the first variable Q-filter;
- subtracting, by a noise removal unit, the noise estimate from the third command current; and
- applying, by the noise removal unit, a subtraction result to the MDPS.

15. The method according to claim 14, wherein the first variable Q-filter and the second variable Q-filter are low-pass filters.

16. The method according to claim 15, wherein at least one of the low-pass filters adjusts a cut-off frequency according to a current steering angular velocity.

* * * * *